A. N. HADLEY.
CANE HARVESTER.
APPLICATION FILED APR. 5, 1906.

1,122,741.

Patented Dec. 29, 1914.
7 SHEETS—SHEET 6.

Witnesses
Inventor
Artemus N. Hadley
BY Bradford & Hood,
Attorneys

UNITED STATES PATENT OFFICE.

ARTEMUS N. HADLEY, OF INDIANAPOLIS, INDIANA.

CANE-HARVESTER.

1,122,741.

Specification of Letters Patent.

Patented Dec. 29, 1914.

Application filed April 5, 1906. Serial No. 310,134.

*To all whom it may concern:*

Be it known that I, ARTEMUS N. HADLEY, a citizen of the United States, residing at Indianapolis, in the county of Marion and State of Indiana, have invented certain new and useful Improvements in Cane-Harvesters, of which the following is a specification.

In the work of harvesting sugar cane, as is well known to those familiar with that work, it is necessary that the leaves shall be stripped from the stalks, that the stalks themselves shall be cut as close as possible to the roots in order to save all the valuable portion thereof, and that the tops, which are not valuable for sugar making purposes, shall be cut off at the proper point, after which the stalks thus treated must be gathered and loaded into suitable vehicles to be hauled away to sugar houses or elsewhere.

It is the object of my present invention to produce a machine which will strip the leaves from the stalks; sever the stalks from the roots and the tops at the proper points, and elevate and load the stalks continuously as they are thus cut and treated.

The accompanying drawings illustrate a portable machine embodying my said invention.

Fig. 9, a detail sectional view as seen from the point indicated by the broken line 9 9 in Fig. 4; Figs. 10 and 11 detail views illustrating the stripping blades, and Fig. 12 a plan view of the carrier table illustrating particularly an alternative means for adjusting the movable platform section.

The machine, as a whole, is carried mainly upon a main combined shaft and axle 21 having ordinary ground wheels 22 and 23 mounted thereon at or near its ends. Clutches 24 and 25 are provided by means of which the shaft-axle 21 may be driven from said wheels when said clutches are in engagement. When said clutches are thrown out of engagement the wheels run loosely on said shaft-axle, and serve as mere carrier wheels, without any effect upon the mechanism. Said clutches are adapted to be operated by a hand lever 26 and ordinary links and levers 27—28 and 29—30, as shown.

A main frame 31 is suitably mounted on the shaft-axle 21, and is of a form and construction adapted to the purpose of my invention. Upon this frame the mechanism is mounted. Various features of this frame will be mentioned or described in connection with the mechanism most closely associated therewith.

The machine is illustrated as being intended to be operated by animal power—usually mules or horses. A tongue 32 is shown ready for a pole team to be attached thereto, and provided with suitable draft apparatus. As it may be impracticable to operate so ponderous a machine with a team which can be conveniently attached in front, I also provide a rear pole 33 (see especially Figs. 1 and 2) to which a pushing team may be connected. This rear pole is pivotally attached to the machine in both directions, having a clip 34 which is mounted on a pivot shaft 35 and to which the pole 33 is connected by means of a pivot bolt 36.

Figure 5:
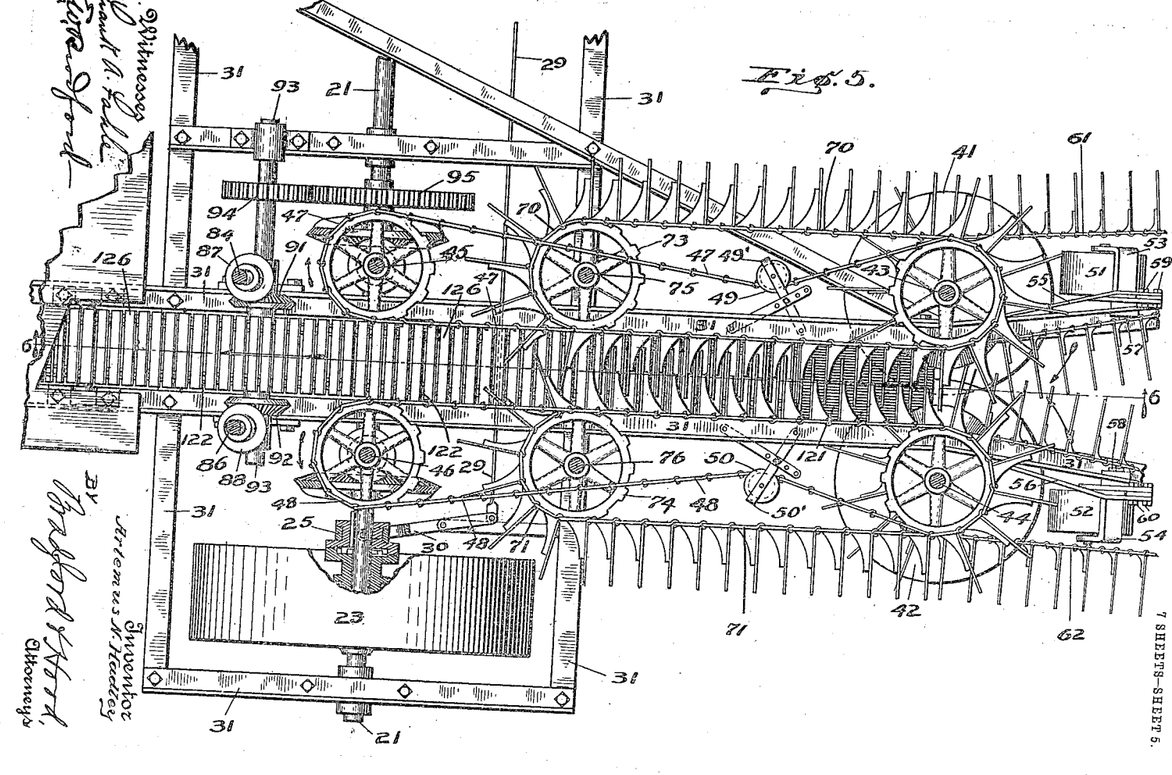
Fig. 5 a horizontal sectional view showing the lower portion of the mechanism in plan on an enlarged scale, as seen when looking downwardly from the broken line 5 5 in Fig. 6.
Figure 6:
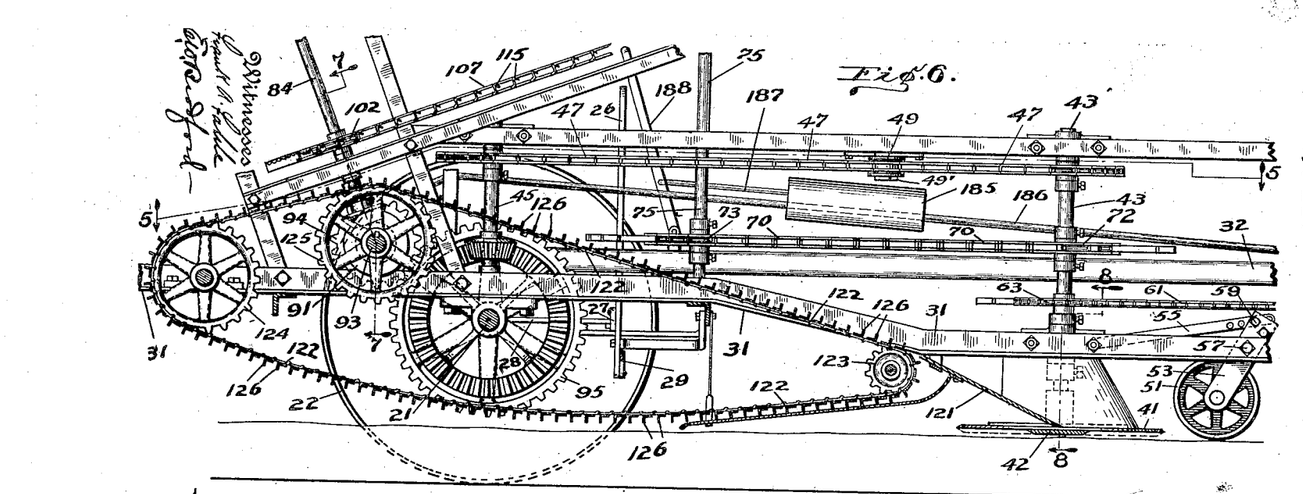
Fig. 6 a central vertical sectional view of the same parts shown in Fig. 5, as seen when looking in the direction indicated by the arrows from the broken line 6 6 in Fig. 5.
Figure 7:
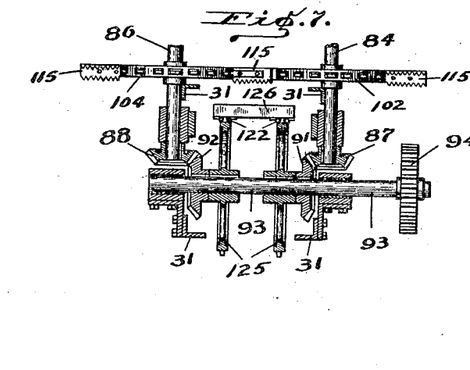
Figs. 7 and 8 transverse vertical sectional views illustrating certain details, as seen when looking in the directions indicated by the arrows from the broken lines 7 7 and 8 8 respectively in Fig. 6.
Figure 8:
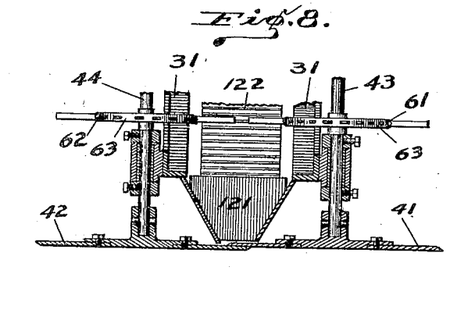

As already stated, it is necessary (in order to save all the valuable part of the cane) that the cutting should take place very close to the roots of the stalks. As the hills or rows are necessarily somewhat unequal, and also have numerous inequalities in their surfaces, the position of the cutters relative thereto must be controlled from the ground itself at a point closely adjacent to said cutters. In other words the cutters must be "floating" as it is termed. As best shown in Figs. 5, 6 and 8 I have provided as cutters a pair of circular disks 41 and 42 carried by vertical shafts 43 and 44, and which act as shears to sever the stalks from the roots. These cutter shafts 43 and 44 are driven from the main shaft-axle 21 through countershafts 45 and 46, and suitable sprocket chains 47 and 48, as is best shown in Figs. 5 and 6—said countershafts being arranged at right angles to said shaft-axle, and driven therefrom by suitable bevel gears and pinions, as shown. The sprocket chains are immediately carried by suitable sprocket wheels, and are held to proper tension by suitable tightener idlers 49 and 50 which are carried in adjustable housings 49' and 50' pivotally mounted on a suitable portion of the adjacent framework. Immediately adjacent these cutters 41 and 42, preferably slightly in advance thereof, I provide a pair of small guide wheels or rollers 51 and 52 which are mounted in housings 53 and 54, which are rendered adjustable relatively to the main frame and held in adjusted position by means of links 55 and 56. The housings 53 and 54 are shown as connected to the main frame 31 by pivot bolts 57 and 58, and to the links 55 and 56 by other pivot bolts 59 and 60—the links 55 and 56 being provided with a series of holes, any one of which is adapted to receive a corresponding bolt, and thus hold the housings to adjusted position, thereby raising and lowering the wheels relatively to the frame and permitting the cutters to be held to the proper position relative to the surface of the ground. The cane is drawn in toward the cutters (see especially Fig. 2) by gathering chains 61 and 62 which are driven from sprocket wheels 63 on the cutter shafts 43 and 44 and run around idlers 64 on shafts 65 mounted suitably at extreme points on the frame work which is extended out for that purpose. Carrying chains 70 and 71 are also driven from sprocket wheels 72 on the cutter shafts 43 and 44, and serve to propel the stalks of cane along after they are cut, back onto a traveling carrier (presently to be described), said chains being supported and guided on idler sprocket wheels 73 and 74 on the vertical shafts 75 and 76 respectively which extend up to near the top of the machine, as shown. Near the upper ends these shafts bear other idler sprocket wheels 77 and 78 carrying other carrying chains 79 and 80 which are driven from sprocket wheels 81 and 82 on the vertical members 83 and 85 of the jointed shafts 83—84, and 85—86. These carrying chains 70—71 and 79—80 serve in connection with the other carrying devices to propel the stalks of cane through the cutting and stripping portions of the machine, and deliver them onto the elevating and trimming portion. The upper portions of each of the two shafts 83—84 and 85—86 are vertical, and the lower portions set at an inclination as is most clearly shown in a general way in Fig. 3. The lower portions 84 and 86 have bevel pinions 87 and 88 (see especially Fig. 7), and are thus driven from corresponding bevel pinions 91—92 on a counter shaft 93 which in turn is driven through spur gears 94—95 from the main axle-shaft 21.

Figure 1:
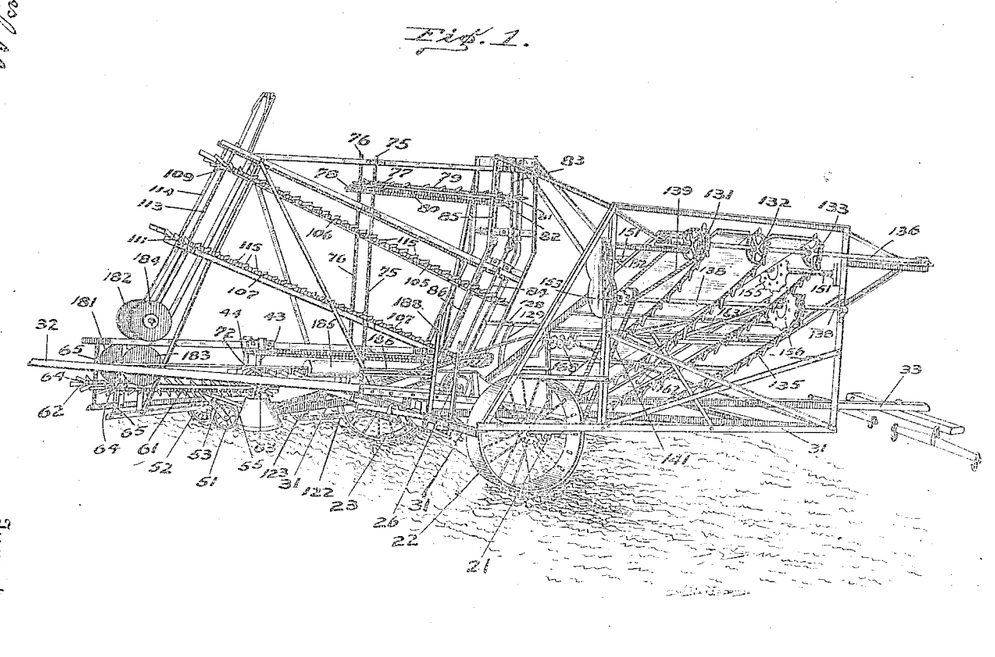
Figure 1 is a perspective view of such a machine.
Figure 2:
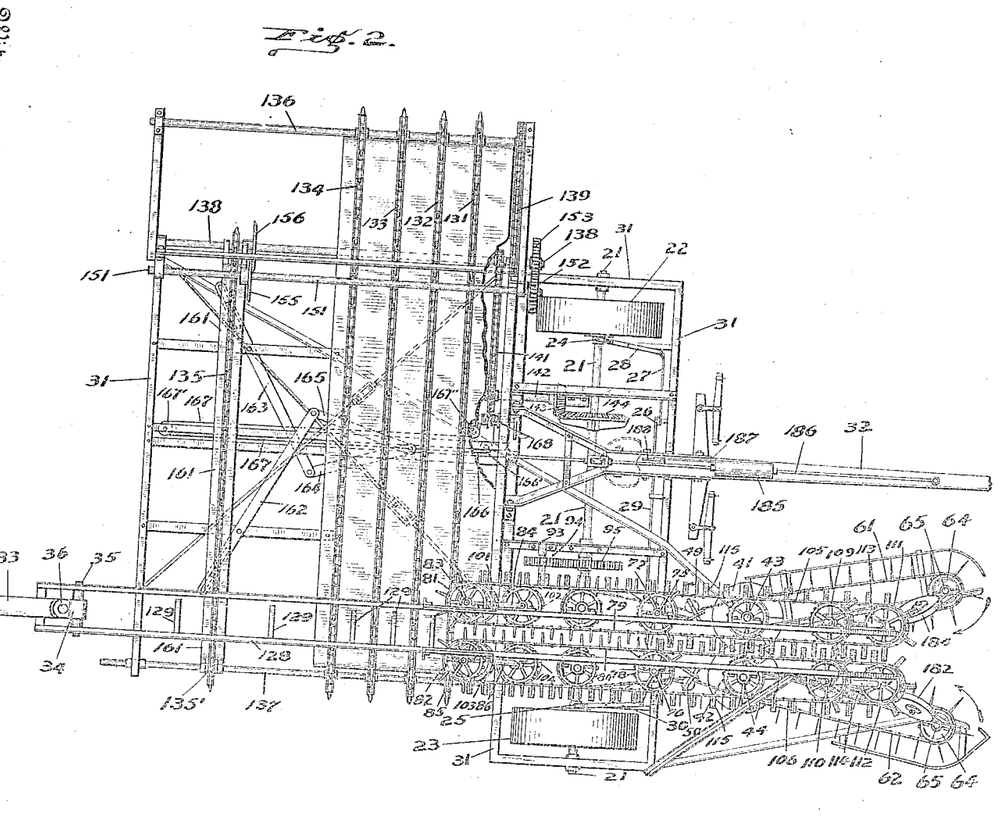
Fig. 2 a top or plan view.
Figure 3:
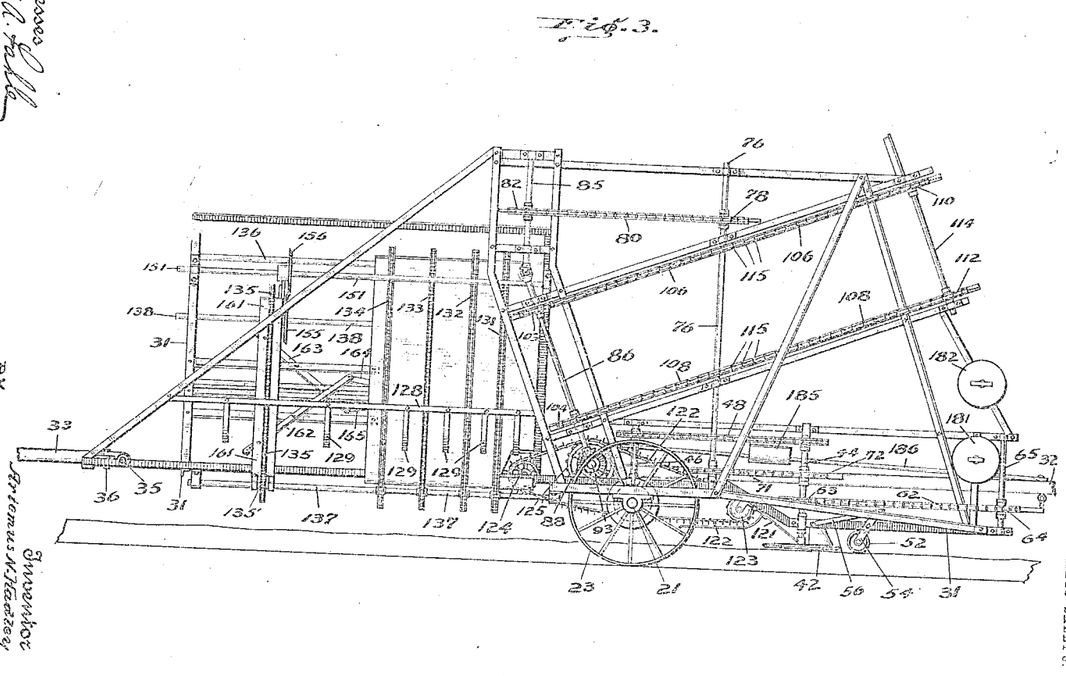
Fig. 3 a side elevation.
Figure 4:
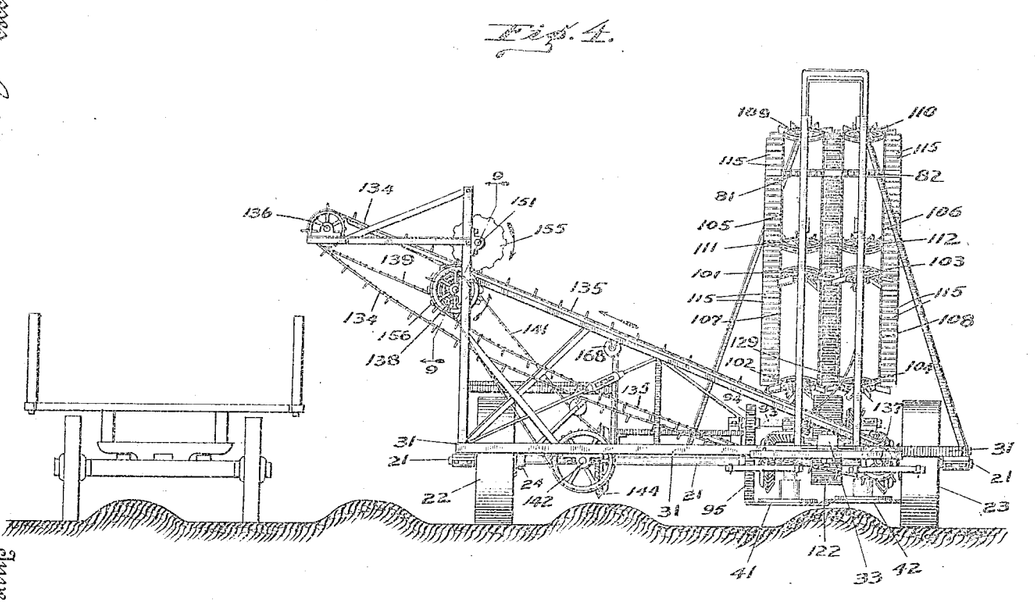
Fig. 4 a rear elevation.
Figures 9, 10, 11, 12:
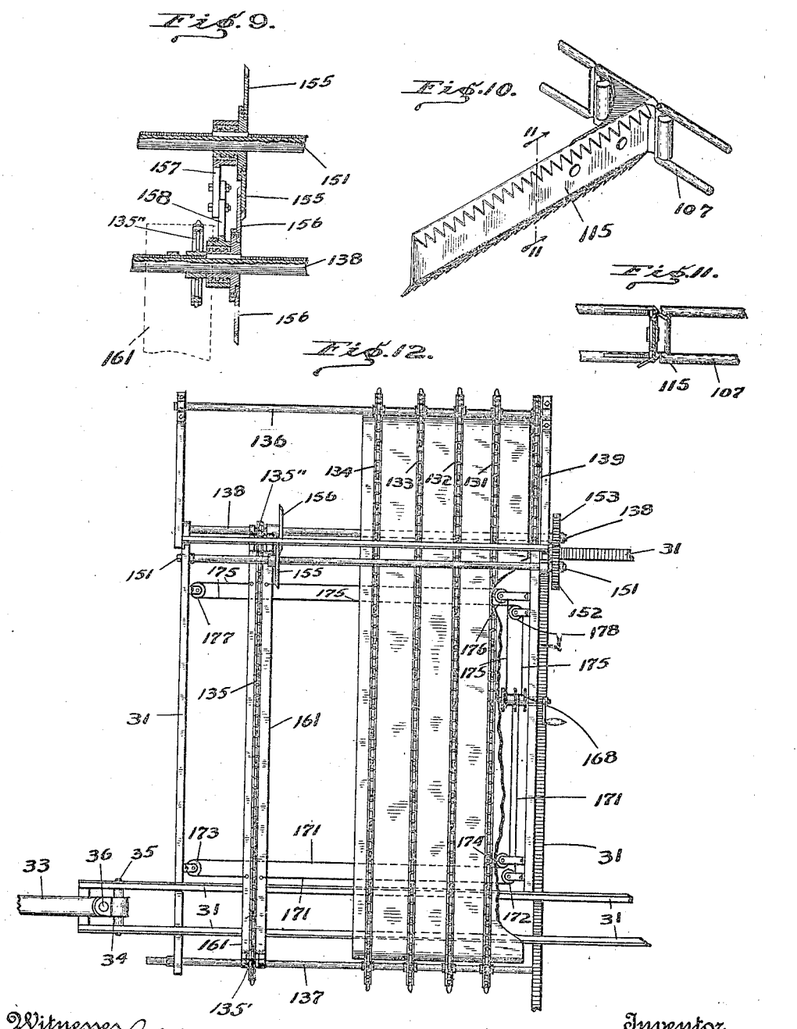

The shaft portions 84 and 86 each carry two sprocket wheels 101 and 102, and 103 and 104. These drive the two pairs of stripping chains 105 and 106, and 107 and 108, which run, respectively, to other sprocket wheels 109 and 110, and 111 and 112 on idler shafts 113 and 114, and which are arranged in a plane forward of the cutting disks in the upper forward part of the machine and are carried in suitable bearings in the frame work at that point. The inclination of the shafts is such that the upper sprocket wheels 101 and 103 on the shafts 85 and 86 are substantially on the same level as the sprocket wheels 111 and 112 on the lower ends of the shafts 113 and 114, so that a stalk of cane entering the stripping chains at the forward end of the machine will by the combined action of the two pairs of stripping chains be stripped down its entire length before it is finally discharged therefrom onto the elevating table. This is a very important feature of my invention, as the leaves are to be found on the stalks of cane at all distances from the butts, so that strippers (to be completely effective) must be operative throughout the whole length of each stalk. The sprocket wheels 109 and 110 are at such an elevation that the chains carried thereby will engage with the tallest cane stalks at their highest valuable point, the stripping action beginning in advance of the cutting operation, while the sprocket wheels 102 and 104 are so low that the chains carried thereby will strip the stalks completely to their extreme butts. The two parts of the two-part shafts 83—84 and 85—86 are connected as before stated by universal joints so that the upper portions carrying the propelling chains may be vertical, thus permitting the carrying chains 79 and 80 to be horizontal, while the stripping chains are at the inclination just described, and all said chains are caused to move uniformly, which is necessary to the regular carrying of the stalks through the machine during the operation in question. The stripping chains are in themselves ordinary sprocket chains with arms on the links at suitable regular intervals, and blades on said arms which are adapted to perform the stripping operation. These blades 115 are so shaped in cross section (as best shown in Fig. 11) that both edges are presented downwardly, and the edges thereof are serrated (as best shown in Fig. 10) both serrated edges being thus adapted to engage with and strip the leaves from the stalks efficiently. After the stalks have been cut at their butts by the cutters 41 and 42 they pass onto a short inclined platform 121 (see Fig. 6) up which they slide, being propelled by the carrying chains, as before described, and are delivered onto the traveling carrier 122 which runs over idler sprocket wheels 123 and 124, and is driven by a sprocket wheel 125 on the counter shaft 93. This traveling flexible carrier 122 runs at an upward inclination, and thus carries the butts of the stalks up close to the lower stripping chains 107 and 108, as before indicated. Said traveling flexible carrier is composed of two ordinary sprocket chains having slats 126 riveted thereto, said slats being formed of sheet metal, and each slat having one portion of its body bent at right angles to the other portion, thus (as best shown in Fig. 6) making pockets which receive the butts of the stalks and hold them from slipping either backward or forward during the time the stalks are being propelled from the cutters to the carrier platform. This construction also holds the stalks from slipping off this carrier as they approach the carrier platform until a short time after the upper ends of the stalks are also released. This insures that the stalk shall fall straight across the carrier platform, the operation being timed so as to deliver the butts of the stalks to the adjacent edge of the platform at just about the time the tops of the stalk have fallen to the opposite side of the platform after having been released from the propelling or carrying instrumentality. The various carrying devices terminate at about the same point—that is, in substantially the same vertical plane—and, as the stalks emerge therefrom they are delivered to the inclined carrier platform, by means of which they are elevated and delivered to the vehicle provided to receive them, as indicated in Fig. 4. The relation of these parts is best shown in Fig. 2. As the stalks leave the carrying and stripping chains they fall over rearwardly, and are received by the several elevating chains 131, 132, 133, 134 and 135, each of which rests upon a board or platform-section, and is suitably driven in the direction indicated by the adjacent arrow in Fig. 4. The cane stalks are prevented from accidentally falling off the platform by guard-arms 129 mounted on a bar 128. The several elevating chains 131 to 134 are driven from the upper shaft 136 which bears corresponding sprocket wheels. Said chains run over other sprocket wheels rigidly mounted on the shaft 137, and thus drive said shaft. The sprocket chain 135 is driven from shaft 137, its sprocket 135' being splined onto said shaft and thus adapted to move longitudinally thereof, although non-rotatable in respect thereto. The sprocket wheel 135" is loosely mounted on the shaft 138 alongside the hub carrying the cutter 156, and is thus adapted to revolve at a different speed from said shaft and cutter. It is, however, caused to travel longitudinally of said shaft uniformly with said cutter and the platform section 161, as these parts are all so connected as to prevent relative displacement. The shaft 136 is driven from said shaft 138 by means of a sprocket chain 139. The shaft 138 is driven by means of a sprocket chain 141 from a counter shaft 142 which is in turn driven by suitable bevel gears 143 and 144 from the main shaft-axle 21. The shaft 138 (as best shown in Fig. 1) also drives a countershaft 151 through spur gears 152 and 153. Said two shafts 151 and 138 carry the coacting cutters 155 and 156 which serve to cut off the tops of the stalks before the said stalks are finally discharged into the vehicle provided to receive them, this being the final trimming operation. These cutters are splined onto the shafts 138 and 151, as is best shown in Fig. 9, and are thus positively driven thereby, although adapted to be adjusted longitudinally of said shafts, together with the adjustable platform section 161, as elsewhere described. In order that said cutters may be held properly, and the shafts prevented from springing as the cutting is done, I provide arms 157 and 158 sleeved onto the hubs of said cutters and connected together, as best shown in Fig. 9. This holds the cutters firmly, and also holds the shafts to the same position relatively to each other at this point. The movable platform section 161 is also connected to the hub of the arm 158. The carrier chain 135 runs over sprocket wheels on the shafts 137 and 138 while the others, as before stated, run over sprocket wheels on the shafts 137 and 136. The space beyond the coacting cutters 155 and 156 and between the shafts 138 and 136 is thus left free, so that the comparatively valueless tops which have been cut off by said cutters may fall to the ground without obstruction.

As cane grows to varying heights in different fields it is desirable (in order that the machine may be most conveniently operated and do its work with the greatest rapidity) that the top-cutters shall be so positioned transversely of the inclined carrier platform that tops of the stalks may be adjusted to be cut off at the proper point with a minimum amount of manual labor. I, therefore, make this top-cutter adjustable toward and from that side of the carrier platform nearest the main cutters which is the side where the butts of the stalks always lie after the stalks have fallen onto said platform. In starting in to cut any particular field of cane these top-cutters should be positioned just that distance from said carrier platform side which will enable them to cut off the tops of the taller stalks of the field at the proper point without any adjustment of said stalks on the platform. As the individual stalks of the field also vary to some extent, it is necessary, also, that a portion of them be adjusted on the carrier platform before they reach the top-cutters. This work must be done by hand; and I, therefore, in operation, have a boy standing on the frame of the machine (alongside the carrier platform) whose duty it is to push out the shorter stalks until the tops will be in proper position to be cut by the top-cutters when said stalks reach said cutters in their travel over said platform.

I have shown two varieties of mechanism for adjusting the top-cutters and connected parts. In Fig. 2 the elevating chain 135, its sprocket wheels, and the top-cutters, are shown in connection with a movable platform section 161, which extends between the two shafts 137 and 138, and is supported by sliding bearings on said shafts. Pivoted crossed levers 162 and 163 are mounted on adjacent portions of the frame-work, and engage with said platform section by pin-and-slot connections, as shown. The other ends of said levers are connected by links 164 and 165 and ropes 166 and 167, with a drum 168, said ropes passing over suitable sheaves 166', 167' and 167''. Revolving the drum 168 in one direction will, as will be readily understood, move the platform section 161 and the top-cutters outwardly, while revolving said drum in the other direction will move them inwardly. The cutter 156 is splined onto the shaft 138, and the cutter 155 is splined onto the shaft 151, so that said cutters are driven positively at all the positions to which they can be adjusted.

In Fig. 12 I have shown another means of effecting the adjustment of the platform section 161, the top cutters and adjacent parts. In this construction instead of using the pivoted and slotted levers I use additional ropes and sheaves. From the drum 168 I run in one direction a rope 171 first over a sheave 172, thence to the movable platform section 161 to which I make it fast, thence over sheave 173, thence around a sheave 174 and back to the winding drum 168. I then connect another rope 175 to another portion of the winding drum 168 and run it first around a sheave 176, thence to the movable platform section 161 to which I make it fast, thence around a sheave 177, and thence around a sheave 178 and back to the winding drum 168. Obviously, by revolving the winding drum in one direction the platform section 161 will be moved outwardly and by revolving said drum in the other direction said platform section will be moved inwardly. Other variations in the construction of this top-cutter adjusting mechanism may be made without departing from my invention.

As the weight of this machine is practically all carried by the main wheels 22 and 23 it is desirable that the main shaft or axle should be at substantially the center of gravity of the machine and its load. In the construction shown (in the machine as actually built) the weight is nearly equally balanced, but is if anything slightly greater behind the main shaft than in front of it. In use there will be a greater portion of the load of the machine behind said shaft than in front of it, and it is, therefore, necessary to provide weights for the purpose of properly balancing the machine. It is also necessary that this weight should be adjustable to compensate for variations in load. I have, therefore, provided several removable weights (as 181, 182, 183 and 184) and mount them on the frame-work at its forward end, and I have also provided a sliding weight 185 on a rod 186,—which said rod serves also as a truss rod to the tongue 32. This latter weight 185 I have connected by means of a link 187 to a lever 188 (see especially Figs. 1 and 6) which is located conveniently to the seat of the driver so that the driver may, by merely moving said lever, adjust said weight along the rod on which it is mounted to points nearer to or farther from the main shaft 21, and thus keep the machine in substantially accurate balance, notwithstanding the variations in its load.

I claim as my invention:

1. The combination, in a cane harvester, of a main shaft-axle, combined driving-and-carrier wheels thereon, a suitable framework mounted on said axle, a harvesting mechanism mounted on said framework in front of said axle, a carrier mechanism mounted on said framework in the rear of said axle, said carrier mechanism being embodied in an inclined platform and said platform having two sections one adjustable toward and from the other, and top-cutters attached to said adjustable section.

2. The combination, in a cane harvester, of a main shaft-axle, combined driving-and-carrier wheels thereon, a suitable framework mounted on said axle, a harvesting mechanism mounted on said framework in front of said axle, a carrier mechanism mounted on said framework in the rear of said axle, said carrier mechanism being embodied in an inclined platform and said platform having two sections one adjustable toward and from the other, top-cutters attached to said adjustable section, and an elevating chain in connection with said top-cutters, said top-cutters and said elevating chain being splined on their shafts.

3. The combination in a cane harvester, with the harvesting mechanism, of an elevating carrier platform, shafts extending across said carrier platform, top cutters mounted on said shafts, and sleeved arms uniting the hubs of said top cutters, whereby they are held to their relative positions.

4. The combination, in a cane harvester, with the harvesting mechanism, of an elevating carrier platform whereby the stalks after they are cut are elevated and delivered to transportation means, said platform embodying an adjustable section movable toward and from its companion whereby it is adapted to stalks of varying lengths, and top-cutters connected to said adjustable section and adjustable therewith.

5. The combination, in a cane harvester, with the harvesting mechanism, of an elevating carrier platform whereby the stalks after they are cut are elevated and delivered to transportation means, said platform embodying an adjustable section movable toward and from its companion whereby it is adapted to stalks of varying lengths, and top-cutters connected to said adjustable section and adjustable therewith, said stalk cutters and the sprocket wheel of the adjacent elevating chain being splined upon their respective driving shafts.

6. The combination, in a cane harvester, with the harvesting mechanism, of an elevating carrier platform whereby the stalks after they are cut are elevated and delivered to transportation means, said platform embodying an adjustable section movable toward and from its companion whereby it is adapted to stalks of varying lengths, top-cutters connected to said adjustable section and adjustable therewith, said top cutters and the sprocket wheel of the adjacent elevating chain being splined upon their respective driving shafts, and means whereby said platform section and said top-cutters are adjusted.

7. The combination, in a cane harvester, with a portable frame work, and cutting mechanism mounted on the framework, of carrier mechanism mounted on the frame work rearward of the cutting mechanism, said carrier mechanism being embodied in an inclined platform comprising two co-operating elevating sections, one of said sections being adjustable toward and from the other, and top-cutters mounted on said adjustable section.

8. The combination, in a cane harvester, with the cutting mechanism, and the carrying mechanism for carrying the cut stalks backwardly away from the cutting mechanism, of stripping devices for stripping the leaves from the stalks while being carried backwardly by said carrying mechanism, said stripping devices consisting of chains armed with stripping blades.

9. The combination, in a cane harvester, with the cutting mechanism, and the carrying mechanism for carrying the cut stalks backwardly away from the cutting mechanism, of stripping devices for stripping the leaves from the stalks while being carried backwardly by said carrying mechanism, said stripping devices consisting of chains armed with stripping blades, said stripping blades being formed with serrated edges.

10. The combination, in a cane harvester, with the cutting mechanism, and the carrying mechanism for carrying the cut stalks backwardly away from the cutting mechanism, of stripping devices for stripping the leaves from the stalks while being carried backwardly by said carrying mechanism, said stripping devices consisting of chains armed with stripping blades, said stripping blades having their edges serrated and bent in opposite directions from the general plane of the blade.

11. The combination, in a cane harvester, with the cutting and carrying mechanism, of means for stripping the leaves from the stalks consisting of chains arranged at an inclination to the plane of the carrying mechanism and provided with means for stripping the leaves.

12. The combination, in a cane harvester, with the cutting and carrying mechanism, of means for stripping the leaves from the stalks consisting of chains arranged at an inclination to the plane of the carrying mechanism and provided with stripping blades, said blades being provided with serrated operating edges.

13. The combination, in a cane harvester, with the cutting mechanism, of means for stripping the blades from the stalks during their passage through the machine consisting of two sets of traveling chains armed with suitable stripping blades, said chains being arranged in planes inclined from the vertical, one set of said chains running at an inclination from near the base of the stalk up to the middle portion thereof, and the other set running from said middle portion to the top thereof, whereby the stalk is subjected to the stripping action throughout its entire length during its passage through the machine.

14. The combination, in a cane harvester, of a centrally-located shaft axle, harvesting mechanism arranged on one side of said axle, gathering mechanism arranged on the other side of said axle, adjustable weights whereby the machine and its load may be kept substantially balanced on said axle, and a lever positioned near the driver's seat whereby one of said weights may be quickly and accurately manipulated.

15. In a cane harvester, the combination with a cutting mechanism, of means for supporting the stalks and carrying same from the cutting mechanism, and a pair of co-acting endless stripper belts each provided with stripping mechanism, said belts being arranged at an angle to the plane of the carrying means, and means for driving said stripper belts.

16. In a cane harvester, the combination with a cutting mechanism, of a carrier adapted to receive the butts of the cut stalks and carry said stalks away from the cutting mechanism, stripping mechanism arranged above said carrier, and means for driving the carrying means and the stripping means in the same general direction away from the cutting mechanism, the stripping mechanism at the same time varying its distance from the stalk carrying means during the stripping action whereby the stripping mechanism, while serving as a support for the stalks, traverses the same longitudinally.

17. In a cane harvester, the combination with a cutting mechanism, of a carrier adapted to receive the butts of the cut stalks and carry the same away from the cutting mechanism, a pair of endless stripper belts arranged above said carrier and inclined to the plane thereof, stripping mechanism carried by said belts, and means for driving said stripper belts and carrier in the same general direction, for the purpose set forth.

18. A cane harvester including cutting means, a carrier operating in one plane to move the cane stalks away from the cutting means, and stripping mechanism arranged in a plane that is inclined to the plane of the carrier and moving downwardly toward the carrier to strip the leaves downwardly from the stalks toward the butts thereof.

19. In a cane harvester, the combination of an axle, wheels on the axle to roll on the ground, a frame mounted on the axle, rotary cutters carried horizontally by the frame adjacent to the ground, rollers adjustably mounted on the frame in proximity to the cutters and guiding the cutters relatively to the ground, the rollers permitting the cutters to cut under the ground surface, and means for depressing the frame forward of the axle to lower the cutters to the ground.

20. In a cane harvester, the combination with carrying wheels, an axle mounted in the wheels, a frame mounted on the axle and extending forward and rearward therefrom, cutting apparatus mounted on the forward portion of the frame, and elevating and topping apparatus mounted on the rearward portion of the frame, of a guide rail mounted on said frame longitudinally thereof, a controllable weight movably mounted on said rail, and means mounted movably on said frame and connected with said weight for controlling the weight.

21. In a cane harvester, the combination with a portable frame, cutting apparatus mounted on the frame, and an elevating conveyer mounted on the frame distant rearwardly from the cutting apparatus, of an inclined guide mounted on the frame and extending approximately from the cutting apparatus to the elevating conveyer for supporting and guiding the butts of stalks, a series of devices for stripping the leaves downward from the stalks movably mounted on the frame and operating above the inclined guide, and movable means for turning the stripped stalks over from the end of the guide onto the elevating conveyer.

22. In a cane harvester, the combination with a portable frame, cutting apparatus mounted on the frame, means mounted on the frame for supporting and guiding the cane stalks upwardly and rearwardly away from the cutting apparatus, and an inclined conveyer mounted transversely on the frame rearward of the supporting and guiding means, of stripping apparatus movably mounted on the frame above the cutting apparatus and the supporting and guiding means, stalk-feeding means mounted on the frame and operating above the end of the supporting and guiding means, and guiding appliances mounted on the frame above the lower portion of the inclined conveyer and beyond the end of the supporting and guiding means.

23. In a cane harvester, the combination with a portable frame, cutting devices mounted on the frame, and an elevating conveyer mounted on the frame distant rearwardly from the cutting apparatus, of a series of feeding devices mounted on the frame in a plane above and forwardly of the cutting devices, a guide mounted on the frame rearwardly of the cutting devices and extending upwardly therefrom, a second series of feeding devices mounted on the frame in a plane above and inclined oppositely to the plane of the guide and extending toward the conveyer, and a third series of feeding devices mounted on the frame in a plane above the plane of said second series of feeding devices and extending farther rearward toward said conveyer than said second series of feeding devices.

24. In a cane harvester, the combination with a portable frame, and cutting apparatus mounted on the frame, of carrying mechanism for carrying the cut stalks backwardly and upwardly from the cutting apparatus, rotatable devices mounted on the frame on a plane above the carrying mechanism, and stripping devices mounted on and guided by the rotatable devices for stripping the leaves from the stalks while the latter are being carried by the carrying mechanism, the stripping devices coöperating with the carrying mechanism and stripping the leaves progressively from the tops of the stalks downward while the stalks are carried upwardly by the carrying mechanism.

25. In a cane harvester, the combination with a portable frame, stalk cutting devices and also feeding devices mounted on the frame on opposite sides of a vertical plane, stripper operating means mounted on the frame in a plane above the cutting devices and on opposite sides of said vertical plane, and stripping devices carried by said operating means and movable thereby into said plane and also downwardly toward the horizontal plane of the cutting devices, of stalk supporting and guiding means mounted on the portable frame and extending below the feeding devices and from the cutting devices rearwardly and also upwardly under said stripping devices for forcing the cut stalks progressively upward relatively to said stripping devices and in opposition thereto during rearward movement of the stalks away from the cutting devices, for stripping the leaves successively from the stalks.

26. In a cane harvester, the combination with stalk cutting devices, stalk conveying means including elevating means rearward of the cutting devices, and movable gathering devices forward of the cutting devices, of stripping means carried forward of the vertical plane of and also above the cutting devices and above the plane of the gathering devices operating downwardly in opposition to the elevating means for stripping the leaves successively from the stalks in advance of and continuously while cutting and conveying the stalks.

27. In a cane harvester, the combination with a portable frame, and stripping means mounted on the forward end portion of the frame for stripping leaves from the upper portions only of cane stalks while standing uncut on and also successively stripping leaves after cutting from the ground, of cutting devices mounted on the frame rearward of the end portion thereof and in a plane below and intermediately of the limits of operations of the stripping means to cut the stalks while standing and while the stripping operations are being performed.

28. In a cane harvester, the combination with stalk-cutting means, and feeding means for moving the cane stalks uprightly away from the cutting means, of movable stripping mechanism arranged in a plane above the plane of the cutting means and operating downwardly, and inclined supporting and guiding means arranged below the plane of the feeding means for supporting and guiding the stalks upwardly and progressively in opposition to the stripping mechanism.

29. In a cane harvester, the combination of stalk cutting means, an inclined supporting guide extending upwardly from the cutting means, and feeding means for moving the stalks uprightly away from the cutting means and upwardly upon the guide, with stripping apparatus arranged above the supporting guide and coöperating therewith for stripping the leaves successively from the respective stalks as the stalks are moved progressively up the supporting guide relatively to the stripping apparatus.

30. In a cane harvester, the combination of a main axle, wheels on the axle, a frame mounted on the axle, cutting apparatus and also stripping apparatus mounted on the frame forward of the axle, means for adjusting the frame to carry the cutting apparatus close to the ground, and carrier mechanism and also top-cutters mounted on the frame rearward of the axle.

31. In a cane harvester, the combination with a portable frame, of cutting apparatus comprising a pair of coöperating cutters and also stripping apparatus mounted on the frame and adapted to operate in advance of the action of the cutters, carrier mechanism mounted on the frame rearward of the cutting apparatus, the carrier mechanism being embodied in an inclined frame and movable elevating apparatus mounted on the frame, and top-cutters mounted on the inclined frame.

32. In a cane harvester, the combination of a main axle, wheels on the axle, a frame mounted on the axle, cutting apparatus mounted on the frame forward of the axle, means enabling the frame to adjustably carry the cutting apparatus close to the ground, stripping means and also conveyer means mounted on the frame forward of the axle, carrier mechanism mounted on the frame rearward of the axle, and top-cutters coöperating with the carrier mechanism.

33. In a cane harvester, the combination with carrying wheels to roll on the ground, an axle mounted in the wheels, a frame mounted on the axle and extending forward and rearward thereof, rotary cutting apparatus mounted on the forward portion of the frame, and stripping means mounted on the forward portion of the frame above the cutting apparatus, of adjustable means mounted on the frame for raising or lowering the forward end of the frame and thereby adjusting the cutting apparatus and the stripping means relative to the ground, the adjustable means including a guide roller for guiding the frame.

34. In a cane harvester, the combination with carrying wheels, an axle mounted in the wheels, a frame mounted on the axle and extending forward and rearward therefrom, cutting apparatus and stripping devices mounted on the forward portion of the frame, and elevating and also topping apparatus mounted on the rearward portion of the frame, of a guide rail mounted on the frame and extending above the axle and also forward therefrom, and a weighting appliance movably mounted on said rail to be carried either above or away from said axle and relatively to the cutting apparatus and the stripping devices.

35. In a cane harvester, the combination with a portable frame, of rotary cutters mounted on the frame, inclined stalk-guiding means mounted on the frame and extending rearward from the cutters to receive the stalks, and stripping means carried by the frame forward of the vertical plane of the cutters and extending operatively also rearwardly of said plane above the guiding means, for stripping leaves from the stalks in advance of the operation of cutting the stalks and also continuously stripping while the stalks are on the stalk-guiding means.

In witness whereof, I have hereunto set my hand and seal at Indianapolis, Indiana, this 24th day of March A. D. one thousand nine hundred and six.

ARTEMUS N. HADLEY. [L. S.]

Witnesses:
 CHESTER BRADFORD,
 THOMAS W. McMEANS.